April 18, 1950     F. FRITSCHER     2,504,822
FISHHOOK SETTING DEVICE
Filed Oct. 17, 1944
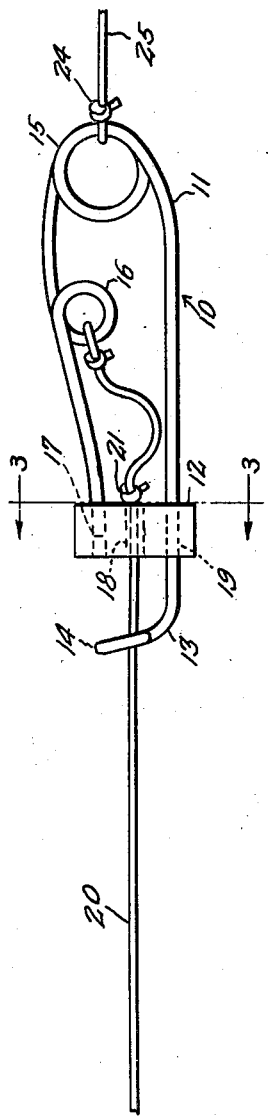
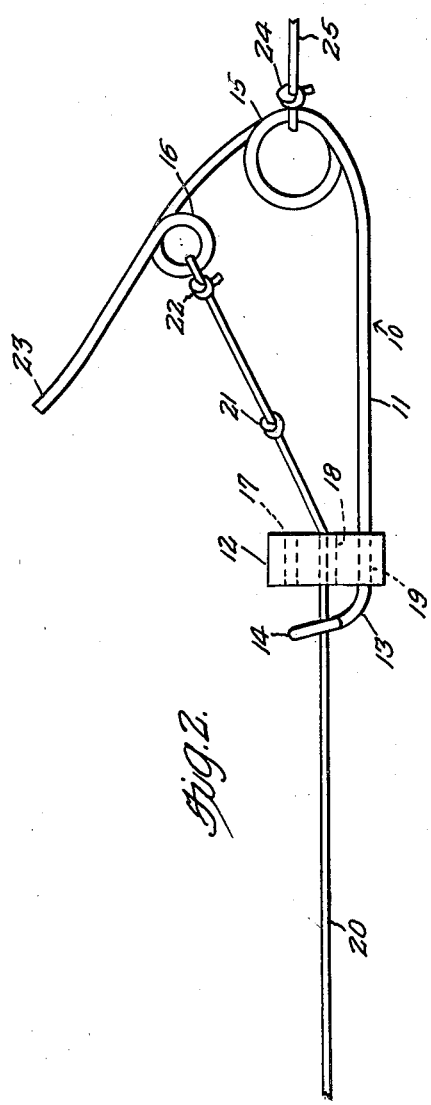
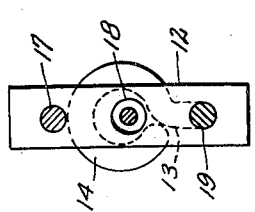
Inventor
*Frank Fritscher*
By *Clarence A. O'Brien and Harvey B. Jacobson*
Attorneys Patented Apr. 18, 1950

2,504,822

UNITED STATES PATENT OFFICE 2,504,822

FISHHOOK SETTING DEVICE

Frank Fritscher, Portola, Calif., assignor of one-half to Thomas J. Austin, Portola, Calif.

Application October 17, 1944, Serial No. 559,033

3 Claims. (Cl. 43—15)

This invention relates to a fish hook setting device.

A primary object of this device is the provision of an improved means for setting a fish hook in the mouth of a fish, after the fish has struck the hook, in an automatic manner.

An additional object is the provision of such a device which will act automatically when the hook is struck by the fish.

A further object is the provision of a fish hook setting means which will be actuated automatically without any operation whatsoever on the part of a fisherman.

Other objects will in part be obvious and in part be pointed out as the description of the invention proceeds and shown in the accompanying drawings, wherein there is disclosed the preferred embodiment of this inventive concept.

In the drawings:

Figure 1 is a side elevational view of the device of the instant invention shown in closed, or set position.

Figure 2 is a view in side elevation, of the device in Figure 1, showing the position of the parts after the device has been operated, and Figure 3 is an enlarged sectional view taken substantially along the line 3—3 of Figure 1.

Like reference numerals refer to like parts throughout the several views of the drawings.

In the drawings, the automatic fish hook set, generally indicated at 10, is comprised of two parts, a wire body 11 and a slide or trigger member 12. Body 11 is formed with a front portion bent upwardly as at 13 and formed in a retaining and guiding means comprising a loop 14, a rearwardly extending portion spirally wound as at 15 to provide a resilient action, and looped again at 16 to form an attaching means for the hook portion of a fish line. The trigger member 12 is comprised preferably of a rectangular block provided with three transverse apertures 17, 18 and 19. Aperture 19 is adapted to have passed therethrough the end portion of body 11 before the same is looped and is adapted to slide freely along the extending shank between bends 13 and 15, the bend 13 and loop 14 comprising abutment means preventing the removal of the trigger member from the body.

A fish line 20 of any desired type is adapted to be passed through aperture 18 and have a knot 21, comprising an abutment means for said trigger member, formed therein on the interior side of the trigger member or block 12, the end of the line being then tied as at 22 to loop 16. It is to be noted that the aperture 18 is of a sufficient diameter to permit the line 20 to slide freely therein but insufficient in diameter to permit the passage of the knot 21 therethrough.

When it is desired to set the device, the free end 23 of member 11 is bent downwardly into substantial parallelism with the portion between bends 13 and 15, and the trigger member 12 is slid rearwardly until trigger aperture 17 engages over and holds end 23. The device is then in set position.

Device 10 may be positioned at any suitable point along the fish line, and according to the type of fishing being done the line 20 may simply comprise the leader, or may be a portion of the line of material length. Secured to loop 15 as by a knot 24 is the balance of the line 25 which extends to the pole or the reel or the like.

In operation after the device is set in the manner previously described, the line is cast, or allowed to sink into the water, where the device remains in set position until a fish strikes. Under normal conditions and in the absence of the device of this invention it is incumbent upon the fisherman to twitch or otherwise pull the line at the moment of the strike, in order to set the hook firmly in the fish's mouth and prevent the disengagement of the fish therefrom. It frequently happens that the fisherman fails to do this properly, or at the proper time, and the fish escapes. With the instant invention, however, as the fish strikes, the line is pulled outwardly with respect to device 10 and this pulling effect causes the knot 21 to abut and pull against the trigger member or block 12, due to the fact that it is larger than the aperture 18, as previously pointed out. Such action causes the trigger member to slide forwardly until the trigger aperture releases the end 23, which, due to the resiliency imparted by loop 15, flies upwardly to assume the position shown in Figure 2, thus imparting a twitch or jerk to the line normally sufficient to set the hook firmly in the mouth of a fish.

From the foregoing it will now be seen that there is herein provided a device accomplishing all the objects of this invention and others including many advantages of great practical utility.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A fish hook setting device comprising a spring member, a fish line, a trigger member, said spring member including a coil spring portion terminating in a first and second arm at the ends thereof, said first arm terminating in an upwardly extending loop, said trigger member having a plurality of apertures therein and being freely slidable along said first arm, a fishing line attaching means upon said second arm, said fishing line passing through said loop and through a trigger aperture and secured to said attaching means, abutting means carried by said fishing line and interposed between said trigger member and said attaching means, and means for releasably engaging said second arm in an aperture of said trigger member.

2. In a fishing line having a first portion for carrying a fish hook and a second portion for attachment to a fishing line support, a fish hook setting device positioned between and operatively associated with the adjacent ends of said portions, and comprising a resilient wire member having a first and second arm connected by an intermediate spring portion, a trigger member having first and second apertures, said first aperture loosely encircling said first arm, retaining and guiding means on said first arm for guiding said first portion and constituting an abutment means for retaining said trigger member on said first arm, means on said second arm for releasably engaging said second aperture in said trigger member, further means on said second arm for receiving one end of said first portion, and cooperating aperture and abutment means on said trigger member and first portion for releasing the trigger member in response to predetermined movement of said first portion relative to said first arm.

3. In a fish hook setting device, a coiled spring portion having depending arms, a trigger member freely slidable upon one arm, integral guide and retaining means at the extremity of said one arm, said trigger member having an aperture for releasably engaging the other of said arms, a string extending through said guide means and trigger member and attached to the other of said arms, and said string being provided with means for abutting said trigger member to release said trigger member from said other arm.

FRANK FRITSCHER.

REFERENCES CITED

The following references are of record in the file of this patent:

UNITED STATES PATENTS

| Number | Name | Date |
| --- | --- | --- |
| 283,444 | Wentworth | Aug. 21, 1883 |
| 716,726 | Leib | Dec. 23, 1902 |
| 783,169 | Ball | Feb. 21, 1905 |
| 1,996,704 | Hawkinson | Apr. 2, 1935 |
| 2,203,618 | Paxton | June 4, 1940 |